United States Patent
Janelle et al.

(10) Patent No.: US 10,064,322 B2
(45) Date of Patent: Sep. 4, 2018

(54) COMPACT TILLAGE IMPLEMENT WITH INDEPENDENT RANK ADJUSTMENT

(71) Applicant: Deere & Company, Moline, IL (US)

(72) Inventors: Luc Janelle, Ankeny, IA (US); Robert T. Casper, Mingo, IA (US)

(73) Assignee: DEERE & COMPANY, Moline, IL (US)

( * ) Notice: Subject to any disclaimer, the term of this patent is extended or adjusted under 35 U.S.C. 154(b) by 85 days.

(21) Appl. No.: 14/863,164

(22) Filed: Sep. 23, 2015

(65) Prior Publication Data
US 2017/0079194 A1 Mar. 23, 2017

(51) Int. Cl.
*A01B 63/32* (2006.01)
*A01B 5/04* (2006.01)
*A01B 21/08* (2006.01)

(52) U.S. Cl.
CPC ............... *A01B 63/32* (2013.01); *A01B 5/04* (2013.01); *A01B 21/08* (2013.01)

(58) Field of Classification Search
CPC ........ A01L 363/32; A01L 37/00; A01L 35/04; A01L 35/00; A01L 39/003; A01L 335/16; A01L 335/28; A01L 339/22; A01L 349/00; A01L 349/02; A01B 21/08; A01B 21/00; A01B 21/02; A01B 21/086; A01B 21/083; A01B 15/14; A01B 15/145; A01B 15/16; A01B 15/18; A01B 63/32; A01B 7/00; A01B 5/04; A01B 5/00; A01B 9/003; A01B 35/16; A01B 35/28; A01B 39/22; A01B 49/00; A01B 49/02
See application file for complete search history.

(56) References Cited

U.S. PATENT DOCUMENTS

| | | | | |
|---|---|---|---|---|
| 436,478 A | * | 9/1890 | Hirshheimer | A01B 15/18 172/602 |
| 500,842 A | | 7/1893 | Aulsber | |
| 1,890,621 A | * | 12/1932 | Newhouse | A01B 21/08 172/281 |

(Continued)

OTHER PUBLICATIONS

Sunflower, Tillage Tools Brochure, 2016.

(Continued)

*Primary Examiner* — Robert Eric Pezzuto
*Assistant Examiner* — Adam J Behrens
(74) *Attorney, Agent, or Firm* — Taft Stettinius & Hollister LLP; Stephen F. Rost

(57) ABSTRACT

A compact tillage implement has a frame supported by front and rear frame wheels. A front rank is mounted to the frame between the wheels with respect to a direction of travel to move a front plurality of tools with respect to the frame from a retracted orientation to an extended orientation. A rear rank is mounted to the frame between the wheels with respect to the direction travel to move a rear plurality of tools with respect to the frame from a retracted orientation to an extended orientation. The rear rank is spaced behind the front rank along a reference line. The front and rear plurality of tools are movable with respect to the frame independently of the other of the front and rear plurality of tools while the frame is in working orientation in which the frame is at a substantially fixed pitch with respect to the ground.

20 Claims, 11 Drawing Sheets

(56) References Cited

U.S. PATENT DOCUMENTS

| | | | |
|---|---|---|---|
| 4,366,760 A * | 1/1983 | Dreyer | A01O 5/06 111/194 |
| 4,492,272 A | 1/1985 | Jensen | |
| 4,535,849 A * | 8/1985 | Dietrich, Sr. | A01B 63/22 172/166 |
| 5,065,681 A | 11/1991 | Hadley | |
| 5,129,463 A * | 7/1992 | Handy | A01B 73/005 172/248 |
| 6,102,132 A * | 8/2000 | Schimke | A01B 15/18 111/139 |
| 6,701,857 B1 * | 3/2004 | Jensen | A01B 63/32 111/200 |
| 8,047,299 B2 | 11/2011 | Hurts et al. | |
| 8,573,319 B1 | 11/2013 | Casper et al. | |
| 9,179,587 B2 * | 11/2015 | Gray | A01B 21/083 |
| 9,313,937 B2 * | 4/2016 | Gray | A01B 21/083 |
| 9,609,797 B2 * | 4/2017 | Dietrich, Sr. | A01B 61/044 |
| 2002/0053444 A1 * | 5/2002 | Hiddema | A01B 21/08 172/601 |
| 2006/0180324 A1 * | 8/2006 | Hake | A01B 21/04 172/158 |
| 2010/0258325 A1 | 10/2010 | Palen | |
| 2011/0192618 A1 * | 8/2011 | Nance | A01B 49/02 172/1 |
| 2011/0284252 A1 * | 11/2011 | Friggstad | A01B 63/32 172/310 |
| 2011/0284253 A1 | 11/2011 | Stevenson | |
| 2012/0048160 A1 | 3/2012 | Adams et al. | |
| 2012/0103642 A1 * | 5/2012 | Stark | A01C 5/064 172/574 |
| 2014/0116736 A1 * | 5/2014 | Dietrich, Sr. | A01B 61/044 172/664 |
| 2014/0190711 A1 | 7/2014 | Horsch | |
| 2014/0262363 A1 * | 9/2014 | Gray | A01B 5/08 172/1 |
| 2014/0262370 A1 | 9/2014 | Kohn et al. | |
| 2015/0034343 A1 * | 2/2015 | Reade | A01B 63/008 172/1 |

OTHER PUBLICATIONS

Summers, Variable-Rate Tillage VRT2530, Brochure, Admitted Prior Art.
German Search Report for 10 2016 217 593.9 dated Dec. 16, 2016.

* cited by examiner

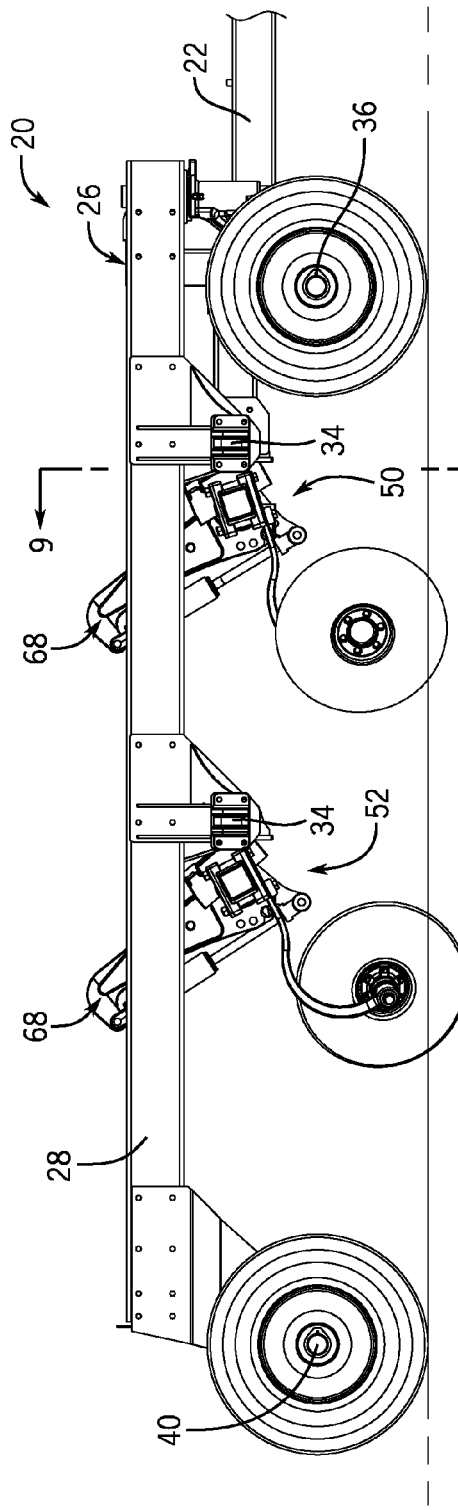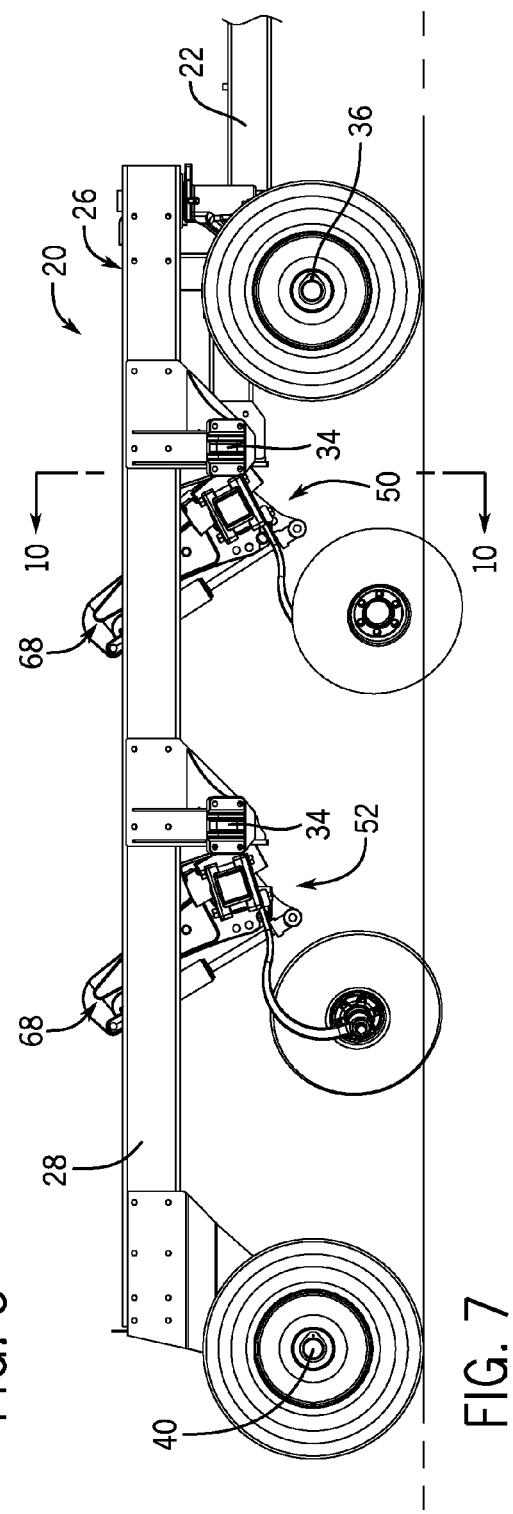

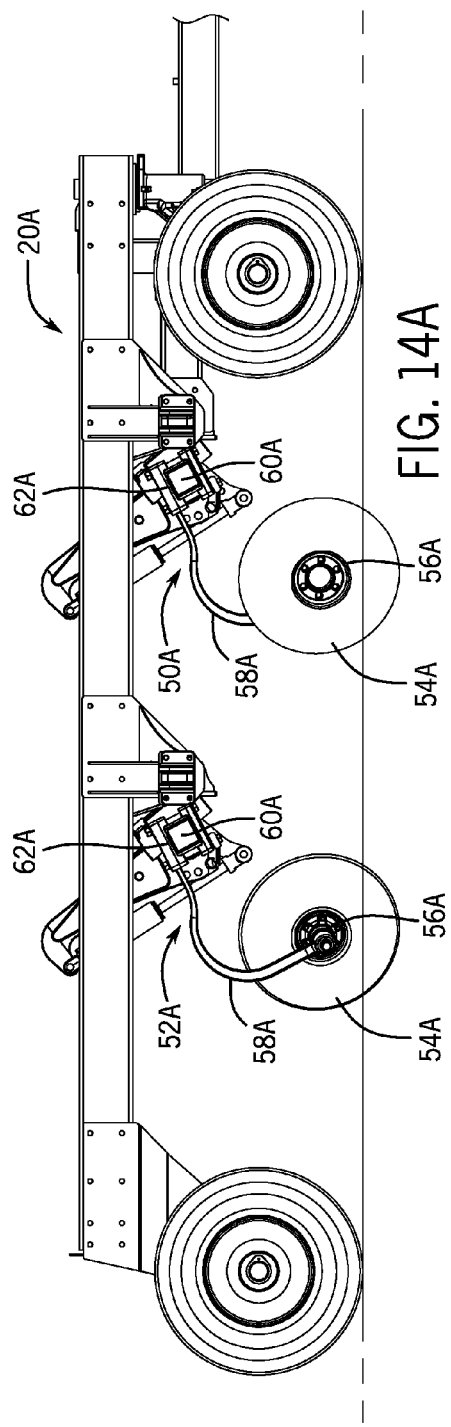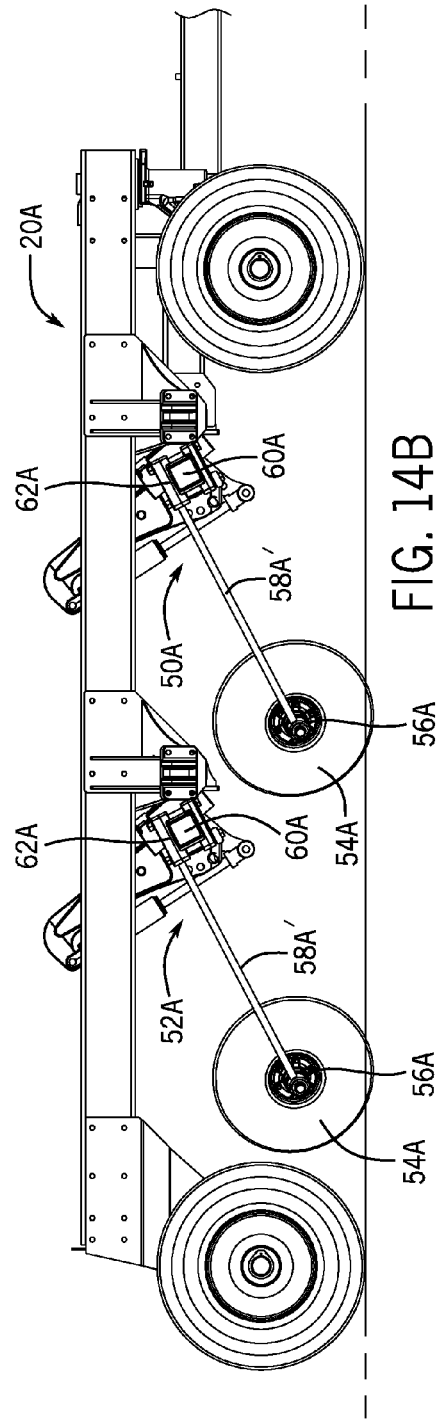

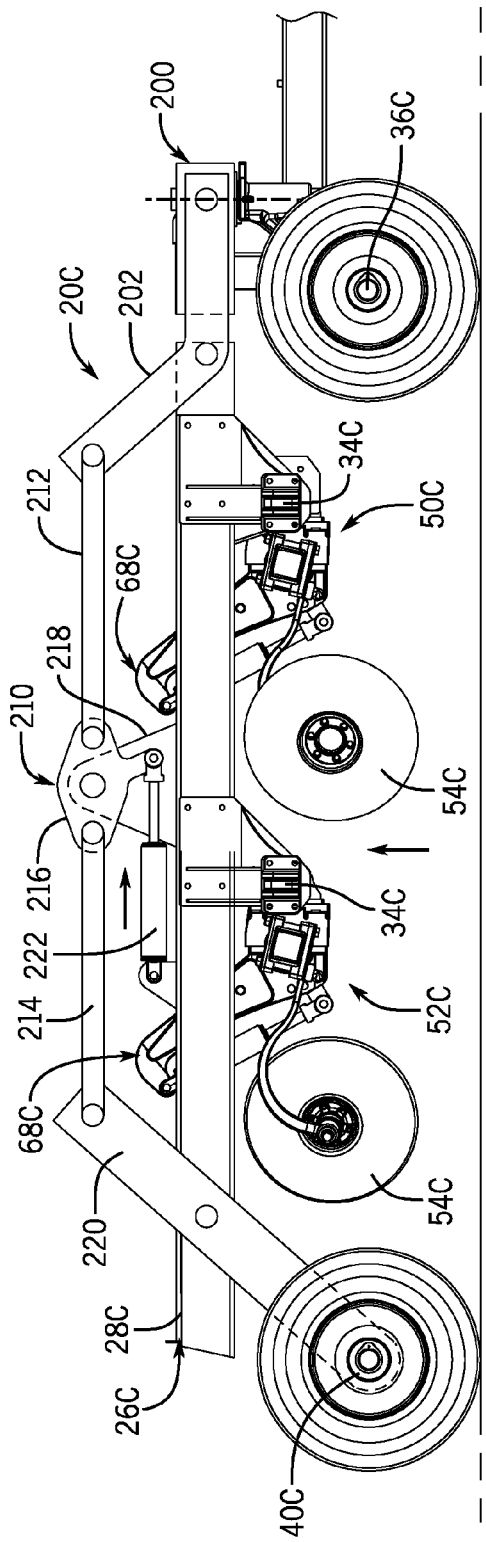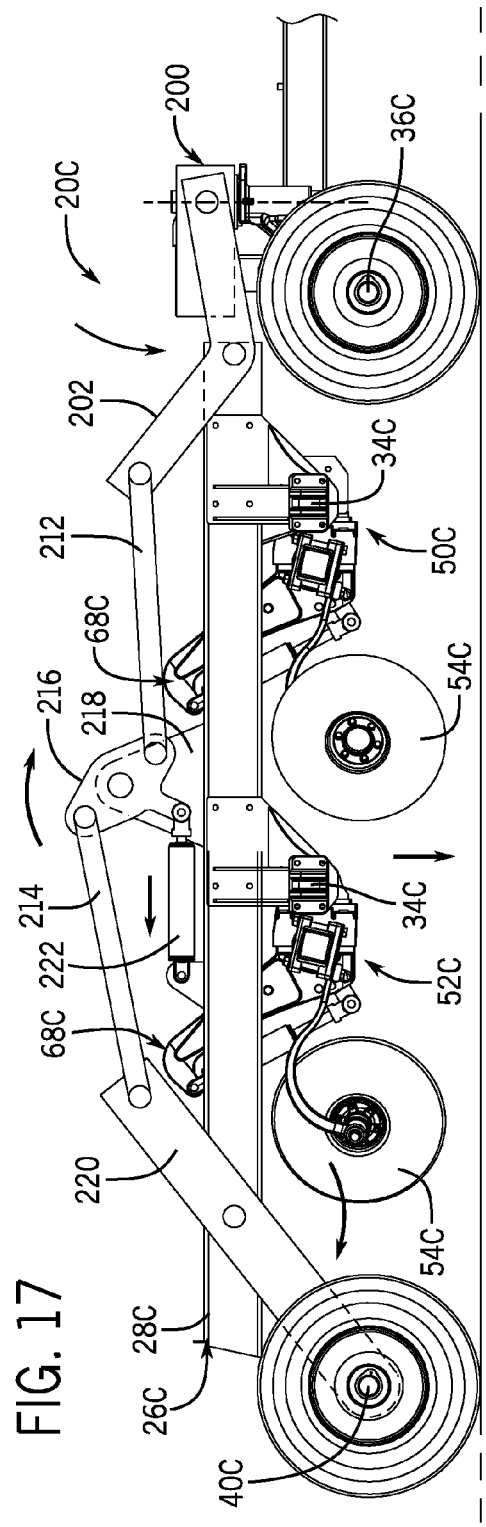

COMPACT TILLAGE IMPLEMENT WITH INDEPENDENT RANK ADJUSTMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to tillage implements and in particular to compact tillage implements.

BACKGROUND OF THE DISCLOSURE

Tillage and other agricultural implements can perform a variety of tasks, such as breaking up tough ground and smoothing the ground surface. Such implements are commonly towed behind work vehicles, such as tractors, and can be outfitted with a variety of ground-engaging tools, such as shanks, disks, harrowing tools and finishing tools, depending on the ground preparation operation being carried out.

SUMMARY OF THE DISCLOSURE

The disclosure generally provides a compact tillage implement with independently adjustable tool ranks.

In one aspect the disclosure provides a compact tillage implement having a frame supported by front and rear frame wheels. A front rank is mounted to the frame between the front and rear wheels with respect to a direction of travel to move a front plurality of tools with respect to the frame from a retracted orientation to an extended orientation. A rear rank is mounted to the frame between the front and rear wheels with respect to the direction travel to move a rear plurality of tools with respect to the frame from a retracted orientation to an extended orientation. The rear rank is mounted to the frame spaced behind the front rank along an implement reference line that extends in the direction of travel and intersects the front and rear ranks. The front and rear plurality of tools are movable with respect to the frame independently of the other of the front and rear plurality of tools while the frame is in a working orientation in which the frame has a substantially fixed pitch with respect to the ground.

In another aspect the disclosure provides a compact disk tillage implement having a frame supported by front and rear frame wheels. A front disk rank is mounted to the frame between the front and rear wheels with respect to a direction of travel to move a front plurality of disks with respect to the frame from a retracted orientation to an extended orientation. A rear disk rank is mounted to the frame between the front and rear wheels with respect to the direction travel to move a rear plurality of disks with respect to the frame from a retracted orientation to an extended orientation. The rear disk rank is mounted to the frame spaced behind the front disk rank along an implement reference line that extends in the direction of travel and intersects the front and rear disk ranks. The front and rear plurality of disks are pivotal with respect to the frame independently of the other of the front and rear plurality of disks while the frame is in a working orientation in which the frame has a substantially fixed pitch with respect to the ground.

The details of one or more embodiments are set forth in the accompanying drawings and the description below. Other features and advantages will become apparent from the description, the drawings, and the claims.

BRIEF DESCRIPTION OF THE DRAWINGS

FIG. 6 is a view similar to FIG. 4 showing the rear disk rank penetrating the ground deeper than the front disk rank;

FIG. 7 is a view similar to FIG. 4 showing the front disk rank penetrating the ground deeper than the rear disk rank;

FIGS. 14A and 14B are views similar to FIG. 4 of other example compact disk tillage implements in which the disks are connected to the ranks by shanks mounted at an upper, frame side of the rank rockshaft;

FIGS. 17 and 18 are views similar to FIG. 4 of yet another example compact disk tillage implement in which the front and rear disk ranks are mounted to the implement frame and the implement frame is moveable with respect to the frame wheels while maintaining pitch, the implement frame being raised in FIG. 17 and lowered in FIG. 18. frame wheels Like reference symbols in the various drawings indicate like elements.

DETAILED DESCRIPTION

Figure 1:
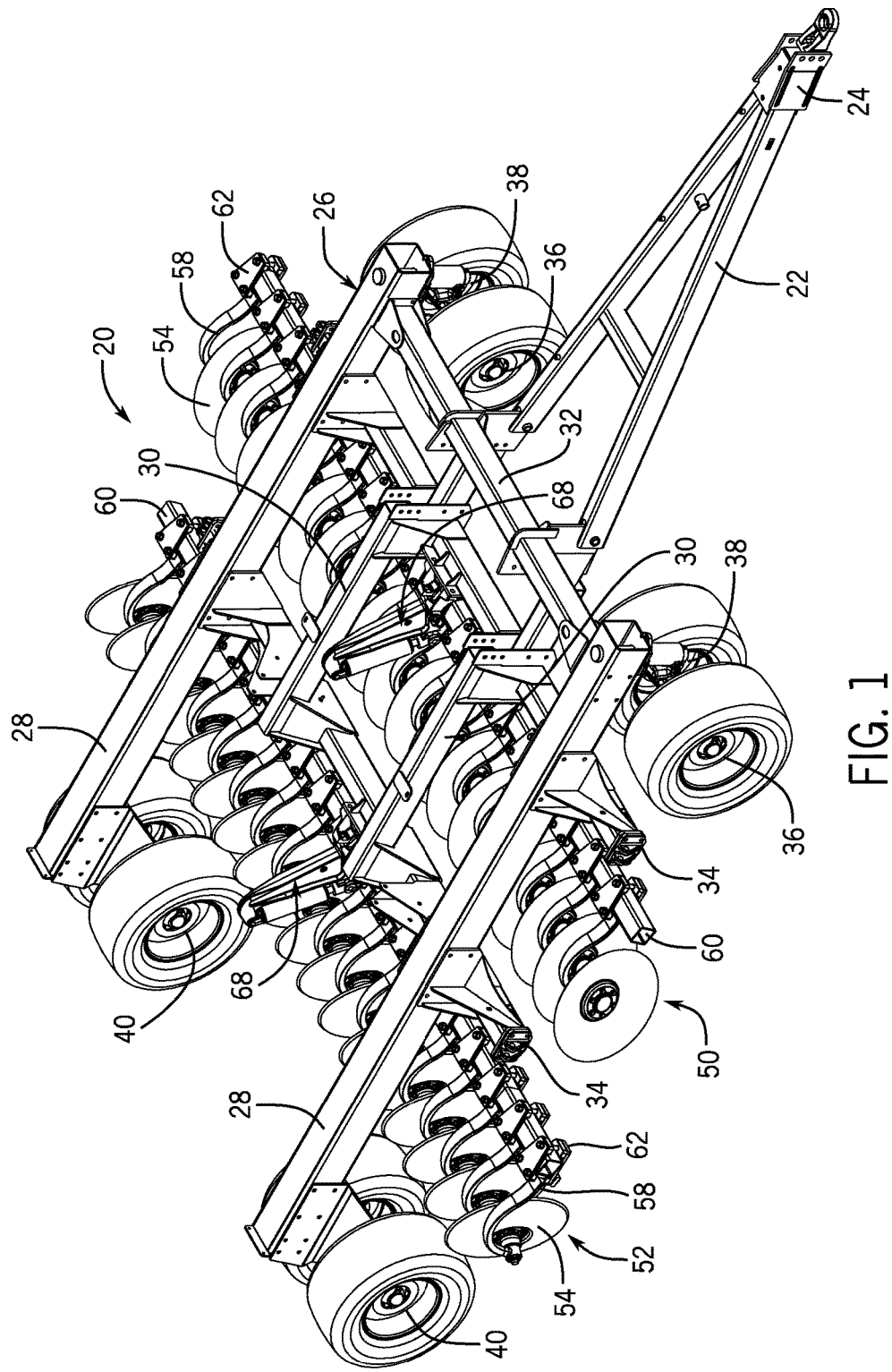
FIG. 1 is a perspective view of an example compact disk tillage implement according to this disclosure.

The following describes one or more example embodiments of the disclosed tillage implement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "aft," "lateral," "horizontal," and "vertical" may be used. Such terms are defined, at least in part, with respect to the direction in which the tillage implement is towed or otherwise moves during use. The term "forward" and the abbreviated term "fore" (and any derivatives and variations) refer to a direction corresponding to the direction of travel of the tillage implement, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Also, the disclosure is presented and discussed at times with respect to specific tillage implements, however, the principles of the disclosure may apply in other tillage implements (e.g., compact and conventional primary and secondary tillage implements) as well as other agricultural implements. Thus, the disclosure should not be limited to the specific examples described below and shown in the accompanying figures of the drawings.

Certain tillage implements, sometimes referred to in the agriculture industry as "compact tillage implements", may have a shortened fore-aft wheelbase and framework and a limited number of ground-engaging tools, for example, one or more laterally arranged front ranks (e.g., front disk ranks) and one or more laterally arranged rear ranks (e.g., rear disk ranks) that are mounted behind the front disk ranks with respect to the direction of travel. The shortened fore-aft dimension of the implement may require that the front and rear ranks be mounted relatively close together and relatively close to the front and rear frame wheels supporting the implement frame. Under certain ground conditions (e.g., wet, heavy soil or high-residue soil), this close spacing may compromise residue flow through the implement (e.g., from clogging of the tools by residue), and thus inhibit tillage performance. For purposes of this disclosure, a "compact tillage implement" will be understood to be a tillage implement that has multiple ranks of tools mounted one in front of the other in relatively close proximity so that the overall fore-aft dimension of the implement is shortened. As in the illustrated examples, the ranks may be arranged perpendicular to the direction of travel so as to further reduce fore-aft space requirements.

In various embodiments, the disclosure addresses diminished residue flow in compact tillage implements through a system for adjustably positioning the ground-engaging tools (e.g., front and rear disk ranks) with respect to the ground, and possibly also with respect to one another and/or the tillage frame and frame wheels. In some embodiments, the system may allow for adjustment of the ground penetration depth and adjustment of the tilt angle. In some embodiments, the tilt angle may be adjusted independent of the penetration depth. The steer angle (or angles) of the ground-engaging tools may be adjusted as well, or the steer angle may generally remain constant during adjustment of the ground penetration depth and/or tilt angle.

Figure 2:
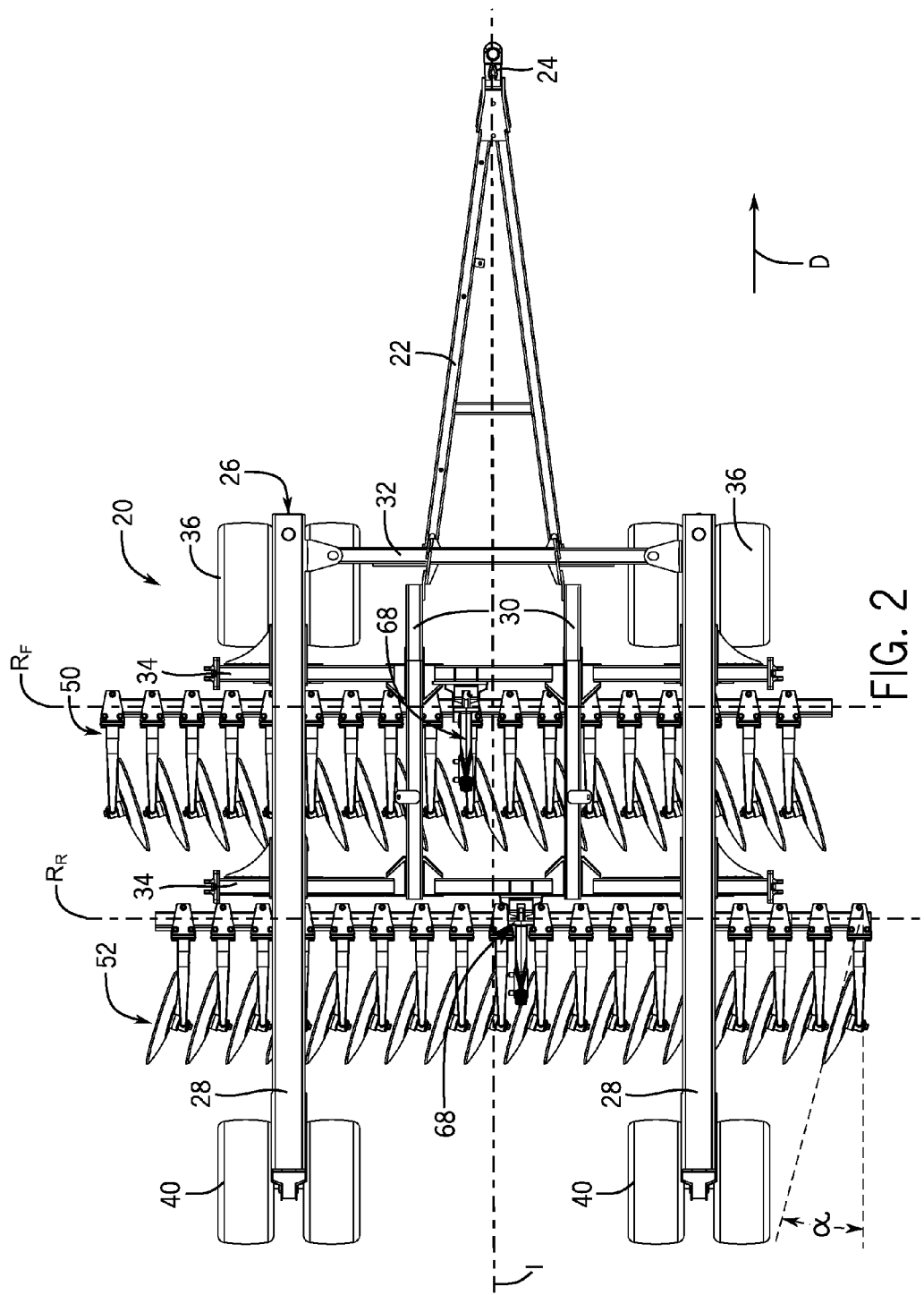
FIG. 2 is a top view thereof.
Figure 10:
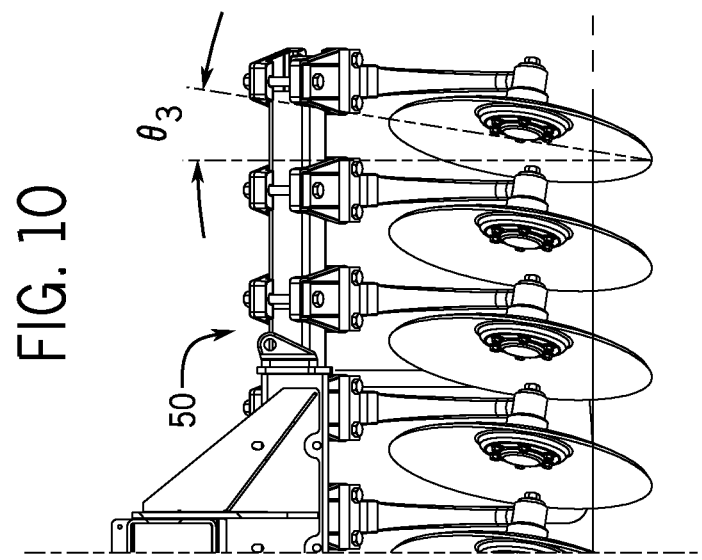
FIGS. 8-10 are partial front sectional views showing the front disk ranks in the positions of respective FIGS. 4, 6 and 7 as viewed from reference planes 8-8, 9-9 and 10-10, respectively.
Figure 9:
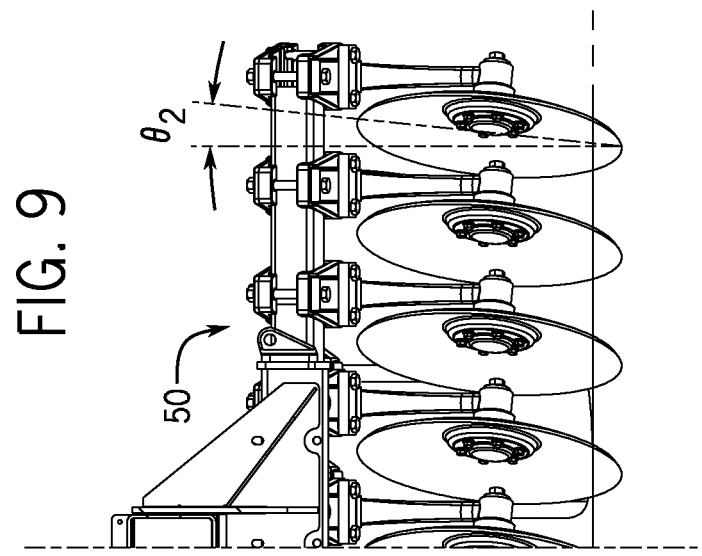
Figure 8:
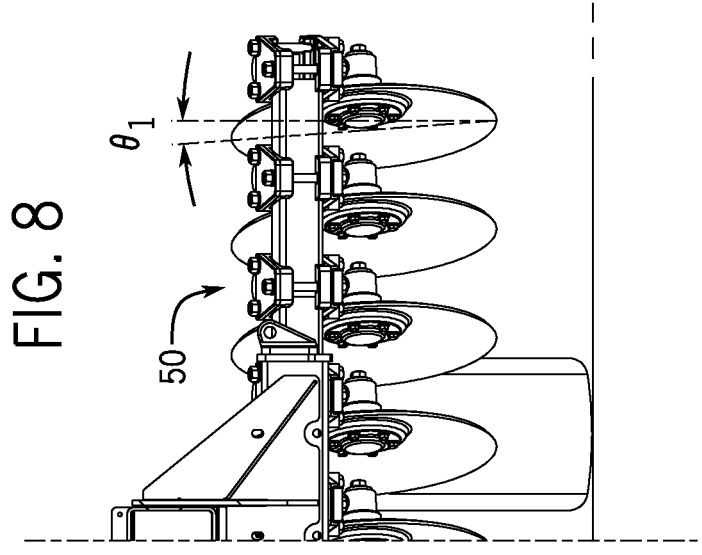

In this respect, it should be understood that penetration "depth" as used herein refers to a vertical distance (or distances) below the surface of the ground to which extends a tip of the tool, or a lower edge location (or locations) of the tool in the case of a rotating tool (e.g., a disk). Also, as used herein the "tilt" angle, sometimes referred to as "scoop" angle for dished or conical tools, refers to an angle (or angles) that a reference plane of the tool makes with a vertical plane aligned with the direction of travel as viewed from a front view (e.g., as shown in FIGS. 8-10). As used herein the "steer" angle refers to an angle (or angles) that a vertical reference plane of the tool makes with the vertical plane aligned with the direction of travel as viewed from a top view (e.g., as shown in FIG. 2).

In certain embodiments, the adjustment the ground-engaging tools with respect to the ground and/or one another may be achieved in part by moving each ground-engaging tool with respect to the tillage frame. In certain embodiments, the adjustment of the ground-engaging tools with respect to the ground and/or one another may be achieved in part by moving the ground-engaging tools with respect to the ground-engaging wheels while maintaining constant their relative orientation with respect to the tillage frame. In certain embodiments, the ground-engaging tools may move relative to the tillage frame and the frame wheels.

The system of this disclosure facilitates the adjustment of the ground-engaging tools with respect to the ground and/or one another while maintaining the pitch orientation (sometimes referred to as the "rake angle") of the tillage frame with respect to the ground. The tillage frame pitch may remain constant whether its relative position changes with respect to one or more of the ground-engaging tools and/or the frame wheels. This allows the tillage frame to remain in a stable orientation without changing orientations with respect to attachments or other supplemental tools or implements supported by the tillage frame. Maintaining the tillage frame pitch keeps the attachments and supplemental tools in the contact with the ground, and/or obviates the need for pitch setting and pitch-compensating mechanisms that may otherwise be needed for proper operation of the attachments and supplemental tools. While the disclosure allows for independent adjustment of the tools with respect to the frame while maintaining the frame pitch, some slight, possibly transient, variation in pitch may occur as a result of the different orientations of the ranks (e.g., by redistribution of loading, etc.) However, any such change in pitch that may occur as a consequence of the rank positioning is not the driver for the change of depth (and/or steer and tilt angles) of the disks. Thus, the term "substantially fixed pitch" is referred to herein to mean that nominally the frame undergoes no change in pitch to change the penetration depth of the disks, even if a slight (e.g., 2-3 degree) pitch variation may result temporarily.

Thus, the disclosure provides a compact tillage implement that may provide improved tillage performance by giving the operator enhanced control of the penetration depth and tilt angle (both collectively and individually) of the ground-engaging tools. The enhanced control may be used to improve residue flow through the implement during operation. Ground contact and ground following of the tools may also be improved. The implements ability to track (i.e., follow the path of) the towing vehicle may also be improved by controlling the penetration depth and/or tilt angle of the tools as needed to cancel (or better even out) oppositely clocked moments realized by the implement from side loading on the tools (e.g., disks with opposite concavity orientations) at different distances from the hitch point, thus reducing the so-called "dog-tracking" phenomenon that may occur in some conventional implements. Further, as noted, these improvements come without affecting the positioning or operation of various supplemental tools or attachments to the implement by maintaining the fore-aft pitch (rake angle) of the implement during or after adjusting penetration depth and/or tilt angle.

Figure 3:
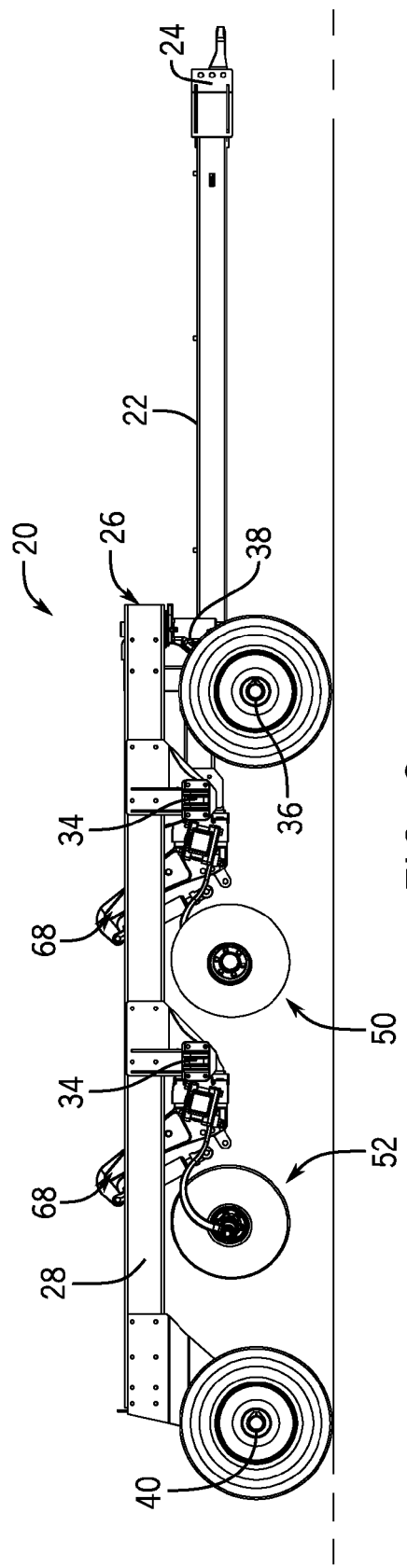
FIG. 3 is a side view thereof showing front and rear disk ranks in a raised, transport orientation.

Having provided a general explanation of the disclosure, one or more example implementations of the disclosed system will now be described in detail to further promote an understating of the disclosure. Referring now to FIGS. 1-3, an example compact tillage implement ("CTI") 20 has a drawbar 22 with a hitch mount 24 at a front end for connecting to a hitch of a tow machine, such as an agricultural tractor (not shown). The drawbar 22 mounts to a frame 26 having long fore-aft frame members 28, short fore-aft members 30, a front lateral frame member 32 to which the drawbar 22 mounts, and rank mounting lateral frame members 34. The CTI 20 may be aligned with an implement reference line "I" (see FIG. 2), which, in certain embodiments, may also represent the fore-aft centerline of the CTI 20. The fore-aft frame members 28, 30 may be oriented generally parallel to the implement reference line I and also to a direction of travel D (see FIG. 2) of the CTI 20, and the lateral frame members 32, 34 may be oriented generally perpendicular to the longitudinal frame members 28, 30, and thereby the implement reference line I and the direction of travel D. The lateral frame members 32, 34 may be rigidly fastened to the fore-aft frame members 28, 30 in a suitable manner, such as by various bolted or welded on brackets. Front pairs of caster wheels 36 are mounted to the front ends of the fore-aft frame members 28 by swivel caster assemblies 38, and rear pairs of fixed wheels 40 are mounted to the rear ends of the fore-aft frame members 28. In the illustrated example, the caster 36 and fixed 40 wheels support the tillage frame 26 off of the ground in a generally level posture in which the fore-aft pitch of the tillage frame 26 is generally parallel to the ground and aligned with the direction of travel D. It should be understood, however, that the tillage frame 26 could have other pitch (rake angle) orientations.

In the illustrated example, the CTI 20 has ground-engaging tools in the form of rotating disks, including front disk rank 50 and rear disk rank 52. As should be understood, additional disk ranks could be included in the CTI 20, or other compact tillage implements, as could tools other than disks (e.g., shanks, rippers, etc.). The front and rear disk ranks 50, 52 each have a plurality of individual disks 54, which, for example, having a circular conical or dished configuration, spaced apart in a row. The disks 54 may each have a bearing hub assembly 56 mounted to a shank 58 that connects to a rockshaft 60 via mounting brackets 62 (e.g., by bolts, welds, etc.).

Figure 5:
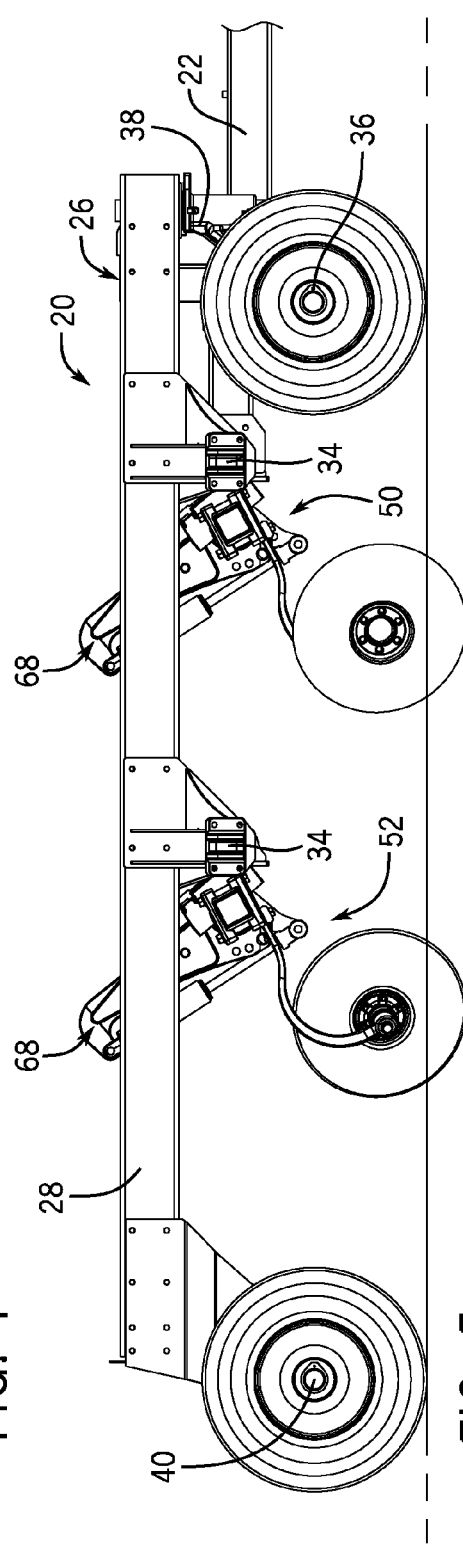
FIG. 5 is a view similar to FIG. 4 showing the front and rear disk ranks lowed to penetrate the ground at the same depth.
Figure 11:
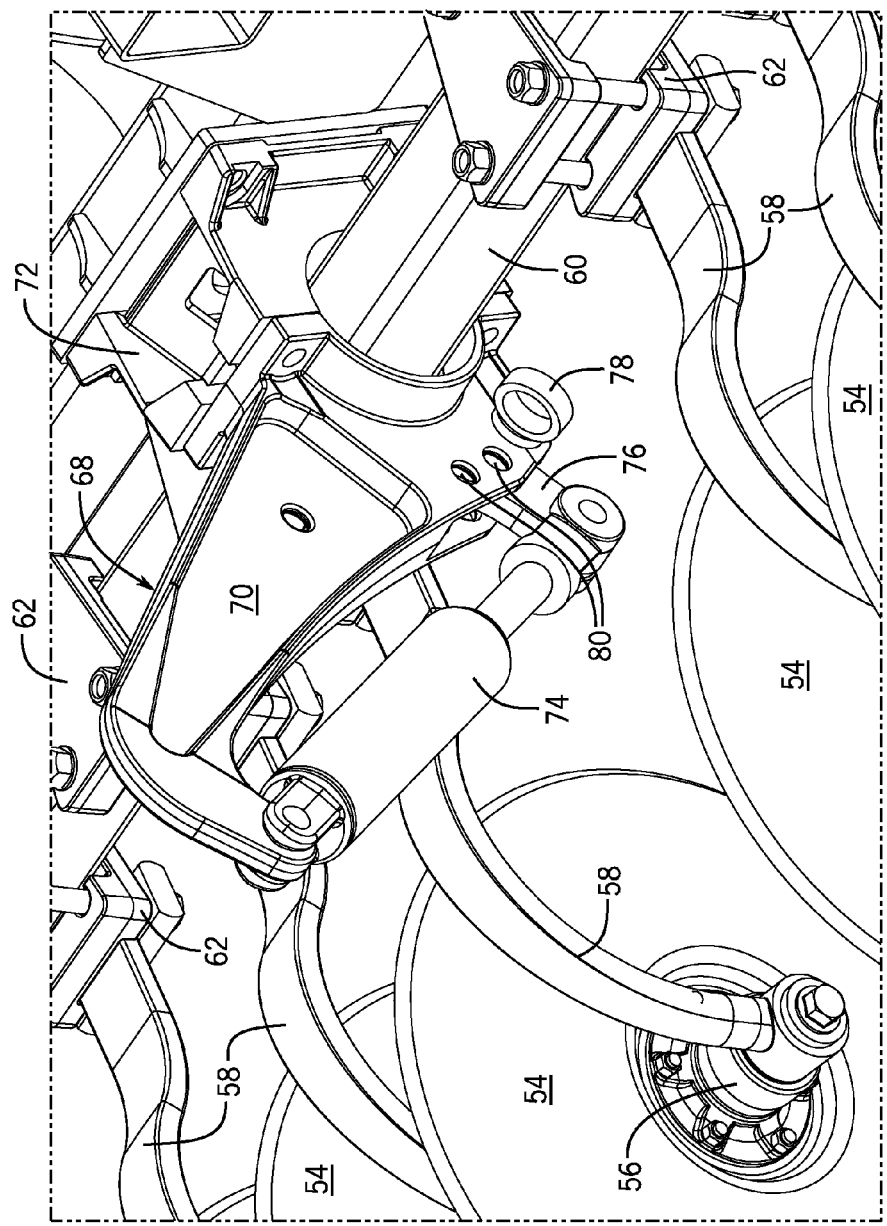
FIG. 11 is a partial rear perspective view showing an example actuator cylinder and mechanical stop arrangement for a disk rank.

In certain embodiments, the shanks 58 may have a configuration that provides an adequate spring rate for rapid tripping of individual disks 54 (e.g., when encountering rocks and other objects), while providing good ground clearance and having a less horizontal, shelf-like profile. For example, as shown in FIGS. 2, 5 and 11, each shank 58 may have a generally sickle-shaped configuration with a generally straight portion that connects to the rockshaft 60 via the mounting bracket 62 and a curved portion that connects to the hub of the associated disk 54. The curved portion may follow a radius or other curve through a bend of 90 degrees or more and an inflection point before transitioning to the straight end. This configuration provides a more vertically oriented configuration at the connection to the associated disk 54 to provide high ground clearance and less horizontal surface area for build-up of ground and residue that may be projected upward and forward during operation. The body of each shank 58 may have a round cross-section at some or all of the curved portion, including at the connection of the disk hub. The round cross-section may transition to a flat cross-section at some portion along its length so as to present a flat end at the connection to the rockshaft 60. The flat end facilitates a secure connection to the rockshaft 60 via the mounting bracket 62 and provides a cantilevered connection with a spring rate that allows rapid tripping of the associated disk 54. As the shank body transitions from flat to round in the rearward direction, the body may taper in the lateral direction. The lateral taper further reduces the available surface area from ground and residue to build up on the shank 58. Other shank configurations are contemplated by this disclosure, including configurations in which the shanks are straight or curved throughout their length.

The mounting locations for the ground-engaging tools may be in any perpendicular or oblique angle lateral mounting orientation with respect to the fore-aft frame members 28, 30, the implement reference line I, and/or the direction of travel D of the CTI 20. In the illustrated example, the front and rear disk ranks 50, 52, are oriented so that the rockshafts 60 are aligned with respective front rank "$R_F$" and rear rank "$R_R$" reference lines (see FIG. 2), which are generally parallel to another another and with the associated lateral frame member 34, which, as described above, may be oriented perpendicular to the fore-aft frame members 28 as well as a vertical plane containing the implement reference line I and the direction of travel D. Moreover, as illustrated, the front and rear disk ranks 50, 52 may be mounted slightly laterally offset and have the disks 54 oriented in opposite lateral directions, that is, the concavity of the disks 54 in the front disk rank 50 faces one lateral side of the CTI 20 and the concavity of the disks 54 of the rear disk rank 52 faces the other lateral side. Additionally, with reference to FIG. 2, the steer angle of the disks may be the same or different with ranks or between ranks. For example, in the illustrated example, the disks 54 of the front and rear disk ranks 50, 52 are mounted to generally have the same, but opposite, steer angle α with respect to the direction of travel D. The tilt angles θ of the disks 54 of the front and rear disk ranks 50, 52 may similarly be arranged to be equal and opposite.

In certain embodiments, the CTI 20 may be an entirely or primarily manual implement, in which the ground-engaging tools (e.g., front and rear disk ranks 50, 52) may be initially positioned and/or adjusted without the aid of power input (e.g., electric or hydraulic motors and actuators). In the illustrated example, the CTI 20 may utilize hydraulic power to position the front and rear disk ranks 50, 52. Although not shown, it should be understood that the towing vehicle may have an on-board hydraulic circuit with hydraulic plumbing lines extending to the CTI 20 to drive one or more hydraulic actuators. The hydraulic circuit may have a hydraulic pump, one or more control valves (e.g., electro-hydraulic valves), and one or more controllers controlling the state of the control valves, and thereby the hydraulic fluid pressure directed to the actuators. An operator may initiate a positioning adjustment of the tools using an operator interface (e.g., control switch, graphical user interface, etc.), which is connected directly or through an on-board network or bus to the controller. The operator input may be any input suitable to change the position of the tools. The range of movement of the actuator may be controlled by the controller based on various control schemes. For example, the controller may have, or connect to, memory or other architecture with timing circuitry, to initiate a counter. The controller may send the control valve a valve open command of a certain duration or a valve close command sent after expiration of the counter. The controller may also be configured to receive feedback input from one or more sensors indicating the position of the tools, for example, including any of various linear or rotary position sensors operatively coupled to the actuators, the tools and/or movable mounting structure. Additionally or alternatively, the positioning of the actuators may be limited by one or more mechanical stop features that may interfere with the stroke of the actuators and cause a pressure spike in the hydraulic circuit that may cue the controller to close the associated control valve or otherwise terminate movement of the actuator. The actuators may be single- or double-acting cylinders effecting the extension, retraction, or both extension and retraction of the tools.

Figure 13:
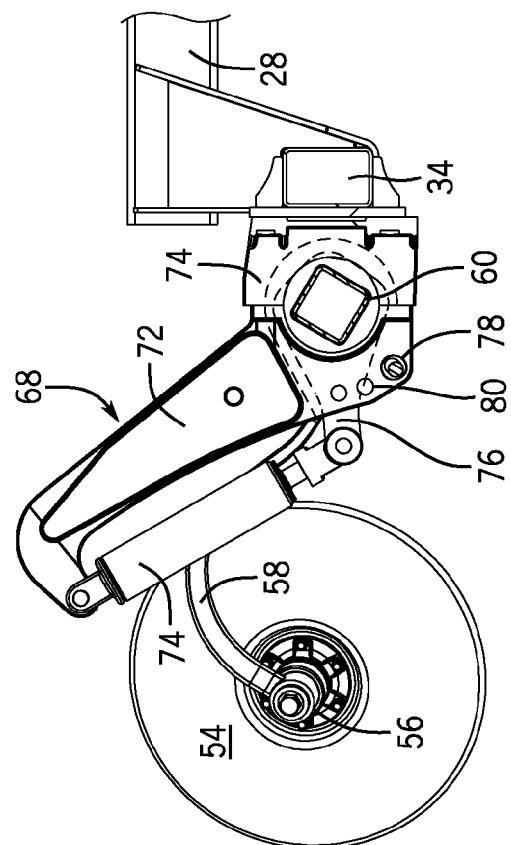
FIGS. 12 and 13 are partial side views showing the actuator of FIG. 11 in different positions with respect to the mechanical stop.
Figure 12:
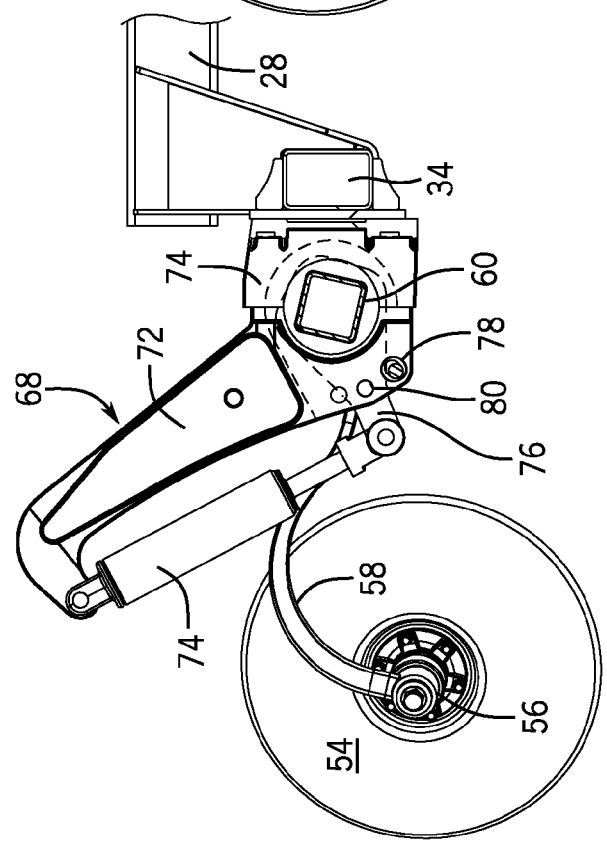

By way of one non-limiting example, the rockshafts 60 of the front and rear disk ranks 50, 52 may be mounted to the lateral frame members 34 by actuator pivot assemblies 68. As shown in FIG. 11, an example configuration of the pivot assemblies 68 has an elongated support arm 70 and a split bearing mount 72, which mounts to the tillage frame 26 (e.g., at ends of the fore-aft frame members 30) and holds a bearing arrangement (not shown) supporting the rockshaft 60. The support arm 70 mounts an upper end of an actuator 74. In certain embodiments, as mentioned, the actuator 74 may be a hydraulic cylinder coupled to a hydraulic circuit (not shown). A lower end of the actuator 74 may be mounted to a lower arm 76 connected to the rockshaft 60 (e.g., by welding or other rigid connection). Referring also to FIGS. 12 and 13, in the illustrated example, a mechanical stop, in the form of a pin 78, may be mounted to the bearing mount 72. Additional openings 80 may be included in the bearing mount 72 for varied mounting of the stop pin 78 to adjust the stroke of the actuator 74, and thus the pivot angle of the rockshaft 60 and the disk ranks 50, 52, to thereby set the penetration depth of the disks 54. Additionally or alternatively, other position limiting stops may be provided by other means, including by various sensors and feedback input to the controller of the hydraulic circuit.

Figure 4:
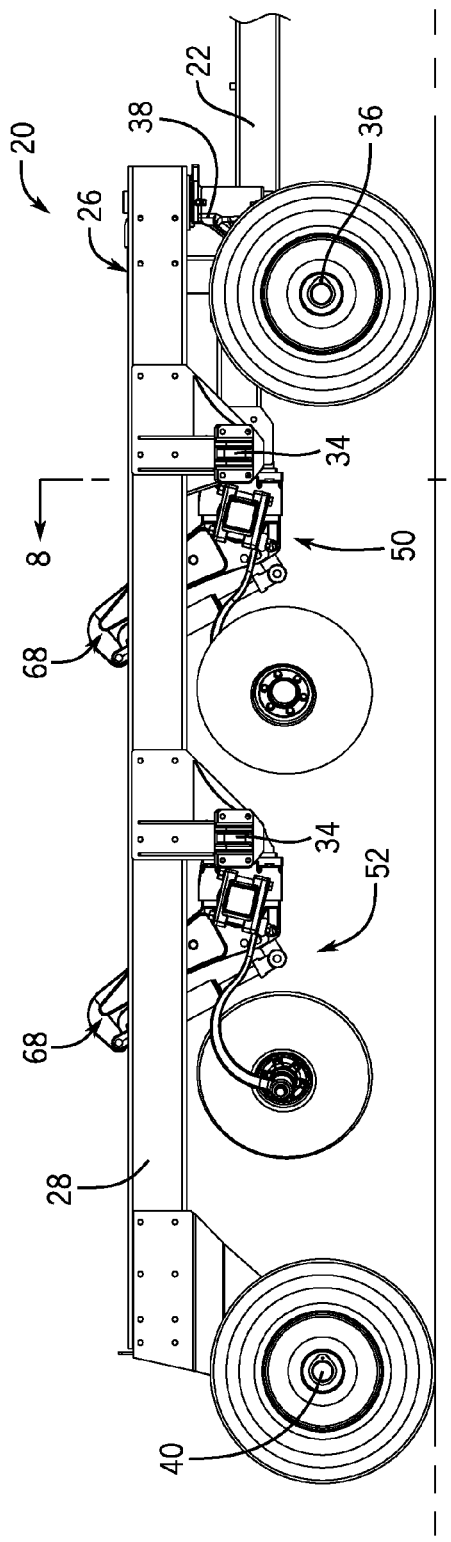
FIG. 4 is an enlarged partial side view thereof.

The positioning of the example CTI 20 shown in FIG. 1 will now be described with respect to the various orientations of the front and rear disk ranks 50, 52 depicted in FIGS. 4-10. FIG. 4 shows the CTI 20 with each of the front and rear disk ranks 50, 52 in a fully retracted orientation, such as when in a transport or non-operational mode of the implement or when high ground clearance is needed. FIG. 5 shows the CTI 20 with both front and rear disk ranks 50, 52 deployed in an example ground-engaging orientation in which the front and rear disk ranks 50, 52 are at the same penetration depth. FIG. 6 shows the CTI 20 with both front and rear disk ranks 50, 52 deployed in an example ground-engaging orientation in which the front disk rank 50 is at a shallower penetration depth than the rear disk rank 52. FIG. 7 shows the CTI 20 with both front and rear disk ranks 50, 52 deployed in an example ground-engaging orientation in which the front disk rank 50 is at a deeper penetration depth than the rear disk rank 52.

The front and rear disk ranks 50, 52 may be moved (e.g., by the hydraulic components acting under the control of the controller) together in unison, for example in the retracted and deployed positions shown in respect FIGS. 4 and 5 (and other positions), by driving the associated actuators 74 the same.

Certain aspects of the disclosure, as will be explained, however, are only realized when the front and rear disk ranks 50, 52 are adjusted separately such that each may achieve a different orientation with respect to the ground, and possibly also with respect to the tillage frame 26 or wheels 36, 40. It should be understood that the term "independent" (and derivatives) as used herein encompasses various manual positioning and powered control schemes. For example, independent positioning may permit adjustment of either the front disk rank 50 or the rear disk rank 52 with respect to the ground without effecting a change in position of the other disk rank. An independent control scheme may also be one in which one disk rank may be positioned with respect to the ground under operator control, and in which the controller commands the other disk rank to move to a position directed by a pre-defined control algorithm in response to the operator initiated adjustment. The controller initiated adjustment may occur after or simultaneously with the operator initiated adjustment, and the algorithm may be programmed so that the controller initiated adjustment is designed to offset the operator initiated adjustment in terms of residue flow through the implement, tracking of the implement with respect to the towing vehicle, a combination thereof, or according to other parameters. In effect, a master-slave control relationship may be established in which when the operator initiates a position adjustment for the master disk rank, the associated actuator is driven to the commanded position, and the slave actuator is driven to a position directed by the control algorithm. For example, the system could operate so that when an operator increases the penetration depth of the front disk rank 50, the controller would command the rear disk rank 52 to raise by a corresponding (or other) height. It should be understood that the position adjustment of the rear disk rank 52 in this case is by adjustment of the slave actuator, not by any change in the pitch or roll of the frame 26 since the change in position of the front disk rank 50 does not change the pitch or roll of the frame 26.

Continuing, in the example CTI 20, each of the front and rear disk ranks 50, 52 is positioned without any change in the position of the other rank. When the operator initiates a position adjustment of either the front disk rank 50 or the rear disk rank 52, the controller will command the associated actuator 74 to extend or retract. The associated pivot assembly 68 will pivot the associated rockshaft 60 within the bearing mount 72. The stroke-length of the actuator 74, and thus the pivot angle of the rockshaft 60, may be fixed mechanically by the pivoting arm 76 contacting the fixed support arm 70, which provides the end stop in the retract direction, and by contacting the stop pin 78, which sets the end stop in the ground-engaging direction. Pivoting the rockshaft 60 pivots the disks 54 via the rigid connection of the shanks 58. Pivoting the disks 54 changes their height, and when lowered sufficient, the disks 54 will cut into the ground.

As will be appreciated, the extent to which the disks 54 are pivoted dictates the ground penetration depth. The pivot angle of the disk ranks 50, 52 also affects the tilt angle of the disks 54, as illustrated in FIGS. 8-10. Specifically, FIG. 8 shows the front disk rank 50 in the retracted position shown in FIG. 4 in which the disks 54 each have a relatively low tilt angle $\theta_1$. As the disk rank is pivoted further away from the tillage frame 26, such as when oriented as shown in FIGS. 6 and 9, the disks 54 each have a tilt angle $\theta_2$, which is greater than tilt angle $\theta_1$. And as the disk rank is pivoted still further, such as when oriented as shown in FIGS. 7 and 10, the disks 54 each have a tilt angle $\theta_3$, which is greater than $\theta_2$. Thus, in the example configuration of the CTI 20 shown in FIG. 1, ground penetration depth and tilt angle increase and decrease together with pivoting of the disk ranks 50, 52 in either clock direction.

In the illustrated example, the disks as mounted at the same tilt and steer angles. The independent adjustment of the ranks allows for the tilt and/or steer angles of the disks to be varied with respect to the other rank and the frame without requiring additional adjustment mechanisms for the disks of each rank. Moreover, the disks are mounted at a consistent spacing with the front disks being concave to the right (from the perspective of FIG. 2) and the rear disks being concave to the left. However, it should be understood that the mounting orientations (e.g., tilt and steer angles and concavity) could be different for each rank, for example, such that the front rank is concave left and the rear rank is concave right or one has a different tilt and/or steer angle than the other. These and other changes to the mounting orientation and configuration of the disks may be possible.

As will be understood by a person of skill in the agricultural industry, that a disk rank with increased penetration depth and tilt angle has a more significant impact on the ground. This may impact the ground-working capabilities of the CTI 20 in various ways, including reduced flow through the implement in certain ground conditions (e.g., wet and/or high residue soil) and poor tracking of the towing vehicle, which may leave areas of the ground unworked, or cause redundant re-working of the ground.

Thus, it will be appreciated that the disclosed system will allow an operator to set the front and rear disk ranks 50, 52 at different heights to change the penetration depth and tilt angle at which each disk rank interacts with the ground. In this way, each disk rank may be set to improve flow through the disk rank and the implement overall. This is especially beneficial when the disk ranks are closely spaced together (e.g., about 1-2 meters) and/or to the wheels in the direction of travel, as in compact tillage implements, such as CTI 20, since the rear disk rank 52 will experience different soil and residue conditions than the front disk rank 50, and those disks 54 near the wheels 36, 40 will experience different soil and residue conditions than the other disks 54.

Moreover, tracking of the CTI 20 may be improved by adjusting the front disk rank 50 with respect to the rear disk rank 52 in order to balance the moments realized by the CTI 20. More specifically, since the disks 54 of the front and rear disk ranks 50, 52 face different lateral sides of the CTI 20, the forces imparted to the disk ranks 50, 52 by the ground are generally in opposite directions. These forces in turn impart moment loads on the CTI 20, and because the disk ranks 50, 52 are different distances from the hitch, the effective lengths of the moment lever arms are different. This means that setting both the front and rear disk ranks 50, 52 at the same ground penetration depth and tilt angle would result in different moment loads on the CTI 20, rather than similar, counteracting moments, and may cause the CTI 20 to mis-track the towing vehicle. It will be appreciated then that using the disclosed system to independently adjust the ground penetration depth and tilt angle of one or both of the front and rear disk ranks 50, 52 will allow the operator to readily cancel the opposing moments, and thereby improve tracking of the CTI 20.

During the position adjustments of the disk ranks to change the ground penetration and the tilt angle of the disks, the steer angle may also change slightly, but generally the disks may remain at a substantially constant steer angle throughout the pivot angle of the rockshaft 60 (i.e., the stroke length of the actuators 74).

By way of one or more non-limiting examples, the compact tillage implement may have two parallel, laterally offset ranks of disks aligned perpendicularly and spaced apart with respect to the direction of travel about 4-6 feet between the rockshafts (i.e., the fore-aft distance between the rank reference lines $R_F$ and $R_R$). The length of the fore-aft frame members 28, and thus the depth of the frame other than the drawbar 22 (sometimes referred to as "frame depth"), is about 12-18 feet. In one or more of the various examples disclosed, the disks and shanks are the same within a rank and between ranks. However, one or more of these aspects of the disks (e.g., shape, diameter, spacing, count, orientations, etc.) and shanks (e.g., length, shape, etc.) may vary within a rank or between ranks. independent adjustment of the ranks. Moreover, the illustrated examples show the compact tillage implement has having a single frame section with two ranks of disks. However, one or more additional sections, each with front and rear ranks of disks, may be included, for example, being hinged or otherwise connected to the main frame for folding. The tillage implement may be configured with disks 54 having a diameter of about 18-26 inches, which may be flat or may be concave, in which case the disk concavity may be defined by a radius of about 20-50 inches. In such configurations, the tillage implement may be adjusted to vary the penetration of depth of the disks 54 between about 0-6 inches. Further, the disks 54 may be oriented at a steer angle $\alpha$ within a range of about 0-25 degrees and a tilt angle $\theta$ within a range of about zero to 20 degrees. Again, the steer and tilt angles may be adjusted independent of the penetration depth of the disks 54.

The tillage implement may take any number of other configurations, including various differences in the platform frame arrangement, the tool type and mounting location, and the tool positioning mechanisms and control. For example, various disk rank arrangements may be incorporated into the implement, such as shown in FIGS. 14A and 14B. The features of the implements shown in FIGS. 14A and 14B are identical to those described above with the exception of the configuration and mounting position of the disk shanks. As such, for simplicity, elements of this and other alternative example embodiments will be referred to using the same reference numbers but with the suffix "A", "B", "C", etc. and/or a prime (') symbol.

In FIG. 14A, the CTI 20A has elongated curved shanks 58A. The shanks 58A may be coupled to the bearing hub 56A of each disk 54A at one end and mounted to the rockshaft 60A via the mounting bracket 62A in both of the front and rear disk ranks 50A, 52A. Each of the shanks 58A is shown as mounted to an upper, side of the rockshaft 60A closer to the implement frame 26A than the side of the rockshaft 60 to which the curved shank 58 was mounted. This higher mounting location provides more clearance from the ground, which thus may improve residue flow. As with the shanks 58, the vertical extension, curved configuration, and tapered body of the shanks 58A help reduce build-up of ground and residue coming over the top of the ranks during operation, and thereby reduce plugging.

In FIG. 14B, the CTI 20A has simplified straight bar (rather than curved) shanks 58A', which, like shanks 58A, are mounted to an upper (or frame) side of the rockshaft 60A. Using straight shanks 58A' may simplify manufacturing and reduce costs. Like shanks 58A, the shanks 58A' may be coupled to the bearing hub 56A of each disk 54A at one end and mounted to the rockshaft 60A via the mounting bracket 62A in both of the front and rear disk ranks 50A, 52A. As mentioned, like shanks 58A, the shanks 58A' are mounted to the upper, side of the rockshaft 60A closer to the implement frame 26A than the side of the rockshaft 60 to which the shanks 58 were mounted. While the straight shanks 58A' could be mounted at the same location as the shanks 58, this higher mounting location provides more clearance from the ground, which thus may be a better mounting location for straight shanks in order to improve residue flow.

Other configurations may provide other benefits. For example, various configurations of the implement may allow for gross height adjustment of the tools (either individually or together) in addition to the pivotal adjustment of the independent positioning arrangement described above. Such configurations of the implement may provide the additional benefit of being able to control the tool's penetration depth separate from its tilt angle, in other words, to allow the operator to change the penetration depth without also changing the tilt angle, thereby giving the operator more precise control of the tools.

Figure 15:
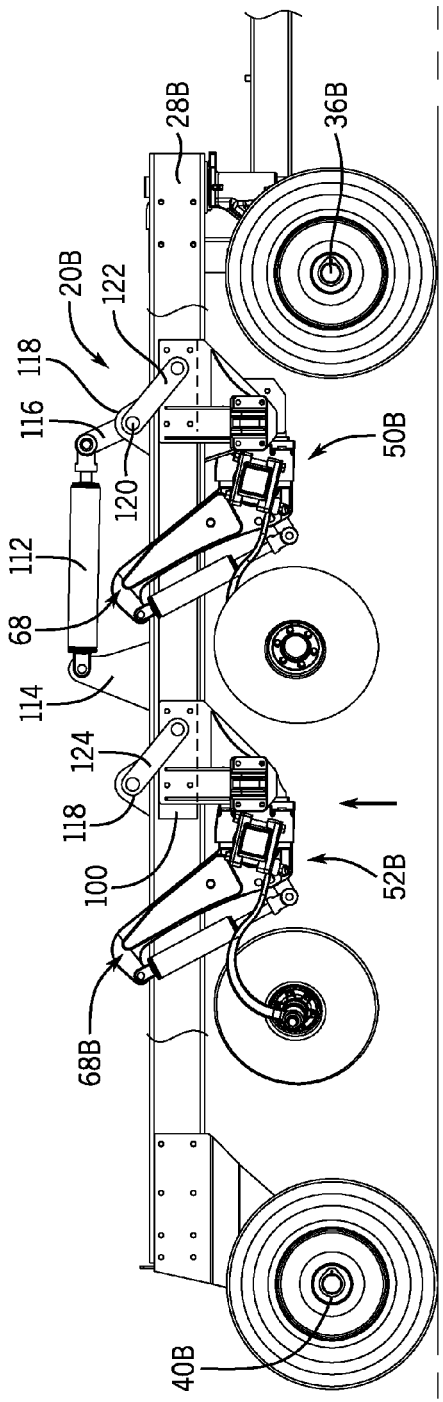
FIGS. 15 and 16 are views similar to FIG. 4 of another example compact disk tillage implement in which the front and rear disk ranks are mounted to a sub-frame, which is moveable with respect to the implement frame and the frame wheels while maintaining pitch, the sub-frame being raised in FIG. 15 and lowered in FIG. 16.
Figure 16:
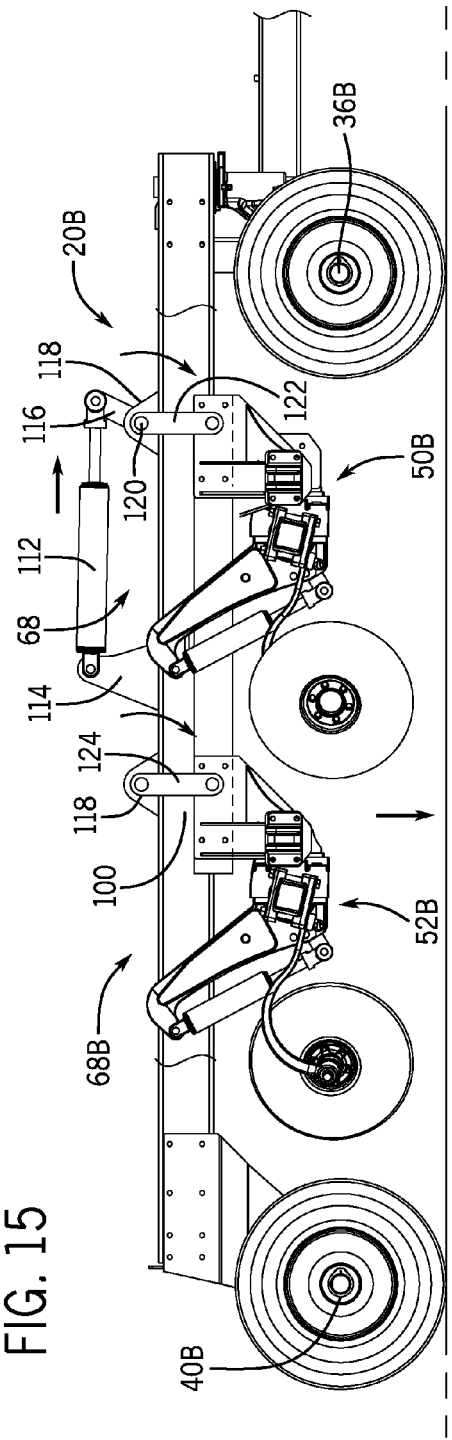

FIGS. 15 and 16 illustrate one example configuration of such a tillage implement, namely CTI 20B. In CTI 20B, the front and rear disk ranks 50B, 52B are mounted to one or more sub-frames that are movable with respect to the fore-aft frame members 28B and the wheels 36B, 40B. Each of the front and rear disk ranks 50B, 52B may be mounted to its own sub-frame and thus be mounted for height adjustments independent of the other disk rank. In CTI 20B, however, both of the front and rear disk ranks 50B, 52B are mounted to a common sub-frame 100, which may be mounted to the frame members 28B by a height adjustment mechanism 110. Whether on separate or a common sub-frame, the CTI 20B may be configured to adjust the height of the disk ranks without changing the rake angle of the frame 26B or the sub-frame 100. For example, the height adjustment mechanism 110 maintains the sub-frame 100 in a generally constant pitch orientation during height adjustments.

In the example configuration shown in FIGS. 15 and 16, the height adjustment mechanism 110 has a four-bar linkage arrangement. Specifically, a sub-frame actuator 112 may be rigidly mounted at one end to one of the frame members 28B via a mounting bracket 114. The other end of the sub-frame actuator 112 may be mounted to a pivot link 116 that is mounted for pivotal movement by a mounting bracket 118 connected to the frame member 28B. A power transfer component, such as shaft 120, couples the pivot link 116 to a front pivot link 122. In this example, the shaft 120 couples the pivot link 116 to the pivot link 122 directly and rigidly, however, indirect coupling (e.g., via gears, pulleys, or other power transfer components) may also be used to increase or decrease the rate of height adjustment of the disk ranks 50B, 52B relative to the stroke of the sub-frame actuator 112. Another pivot link 124 of the same length as the pivot link 122 may be pivotally mounted to the rear of the sub-frame 100 in the same manner. The rear pivot link 124 may be pivotally mounted to the frame member 28B.

The sub-frame actuator 112 may be a hydraulic cylinder that may be operatively coupled to the hydraulic circuit and controlled by the controller described above. Thus, the operator may initiate a change in height of front and rear disk ranks 50B, 52B by instructing the controller (e.g., via the operator interface) to actuate the sub-frame actuator 112. When the sub-frame actuator 112 is extended and retracted, the pivot links 116, 122 and 124 will pivot with respect to the frame member 28B and the sub-frame 100 and move the sub-frame 100 up or down relative to the frame member 28B and the wheels 36B, 40B, and thereby adjust the penetration depth of the disks 54B. Further, the front and rear disk ranks 50B, 52B may be mounted to the sub-frame 100 using pivot assemblies 68B in the same manner as described above. As such, the operator may independently adjust the front disk rank 50B and/or the rear disk rank 52B, as needed.

In the illustrated example, the pivoting of the pivot links 122, 124 may move the sub-frame 100 slightly in the fore-aft direction as the height is changed. However, the fore-aft movement is short enough to have little or no effect on the disk rank positioning. If desired, the pivotal motion of the pivot links 122, 124 could be converted into purely translator (e.g., vertical) motion by having the pivot links 122, 124 connect to the sub-frame 100 at a suitable vertically slotted sliding connection. In this way, the penetration depth of the disks 54B could be adjusted without any corresponding change in tilt angle.

The example of FIGS. 15 and 16 uses a powered actuator. However, an entirely manual mechanism could be devised by replacing the actuator with a rigid bar to complete the four-bar linkage, and including one or more mechanical stops to fix the position of the sub-frame 100 for operation.

FIGS. 17 and 18 illustrate another example configuration of a tillage implement that allows for additional position control of the disk ranks, namely CTI 20. In CTI 20C, the front and rear disk ranks 50C, 52C are mounted to the frame 26C in the same manner as in the example configuration shown in FIG. 1, using the same pivot assemblies 68C. Here, however, gross height adjustment of the front and rear disk ranks 50C, 52C is accomplished by changing the height of the frame 26C with respect to the wheels 36C, 40C. As in the other examples, this height adjustment is provided without changing the rake angle of the frame 26C or the front and rear disk ranks 50C, 52C.

In this example configuration, the caster wheels 36 and the caster assemblies 38 may be mounted to the lateral frame member 32C to form a separate front assembly 200, which is connected to the frame members 28C and 34C via one or more pivotal frame links, such as frame link 202. The frame link 202 may have an angled configuration as shown, with one end pivotally connected to the front assembly 200 and an intermediate location connected to the frame member 28C. The other end of the frame link 202 may be connected to a height adjustment mechanism 210. The height adjustment mechanism 210 may form a four-bar linkage, which includes links 212 and 214 that are pivotally coupled to a rocker arm 216 pivotally mounted to the frame member 28C by a mounting bracket 218. The ends of the links 212 and 214 connect to the frame link 202 and a wheel arm 220, respectively, which pivotally mounts the wheels 40C to the frame member 28C. A frame actuator 222 is rigidly mounted to the frame member 28C at one end and to the rocker arm 216 at the other end.

The frame actuator 222 may be a hydraulic cylinder that may be operatively coupled to the hydraulic circuit and controlled by the controller described above. Thus, the operator may initiate a change in height of front and rear disk ranks 50C, 52C by instructing the controller (e.g., via the operator interface) to actuate the frame actuator 222. When the frame actuator 222 is extended and retracted, the links 212, 214 and the rocker arm 216 will pivot the frame link 202 and the wheel arm 220 to raise and lower the frame members 28C, 34C, and thereby, the front and rear disk ranks 50C, 52C to adjust the penetration depth of the disks 54C. Further, since the front and rear disk ranks 50C, 52C are connected to the frame members 34C using pivot assemblies 68C in the same manner as described above, the operator may independently adjust the front disk rank 50C and/or the rear disk rank 52C, as needed.

In the illustrated example, the pivoting of the frame link 202 and the wheel arm 220 may move the frame members 28C, 34C slightly in the fore-aft direction as the height is changed. However, the fore-aft movement is short enough to have negligible effect on the disk rank positioning. If desired, the pivotal motion could be converted into purely translatory (e.g., vertical) motion by using a suitable sliding slot connection at the frame link 202 and wheel arm 220 connections. In this way, the penetration depth of the disks 54C could be adjusted without any corresponding change in tilt angle.

The example of FIGS. 17 and 18 uses a powered actuator. However, an entirely manual mechanism could be devised without the actuator and including one or more mechanical stops to fix the position of the frame members 28C, 34C for operation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A compact tillage implement, comprising:
a frame supported by front and rear frame wheels in a working orientation;
a front rank mounted to the frame between the front and rear wheels with respect to a direction of travel to move a front plurality of tools with respect to the frame from a retracted orientation to an extended orientation, the front rank includes a front rockshaft configured to mount the front plurality of tools thereon and a plurality of shanks, wherein each of the front plurality of tools is mounted to the front rockshaft by one of the plurality of shanks, the plurality of shanks configured to enable each of the plurality of tools to move vertically independently of one another; and
a rear rank mounted to the frame between the front and rear wheels with respect to the direction of travel to move a rear plurality of tools with respect to the frame from a retracted orientation to an extended orientation, the rear rank includes a rear rockshaft configured to mount the rear plurality of tools thereon and a plurality of shanks, wherein each of the rear plurality of tools is mounted to the rear rockshaft by one of the plurality of shanks, the plurality of shanks configured to enable each of the plurality of tools to move vertically independently of one another, the rear rank being mounted to the frame to be spaced behind the front rank along an implement reference line that extends in the direction of travel and intersects the front and rear ranks;
wherein the front and rear plurality of tools are movable with respect to the frame, the front plurality of tools being movable independently of the rear plurality of tools while the frame is in a working orientation having a substantially fixed pitch with respect to the ground.

2. The compact tillage implement of claim 1, wherein the front and rear ranks are oriented along parallel rank reference lines that intersect a vertical plane containing the implement reference line.

3. The compact tillage implement of claim 2, wherein the front and rear ranks are mounted to the frame so that the rank reference lines are perpendicular to the vertical plane containing the implement reference line.

4. The compact tillage implement of claim 3, wherein each tool is a disk; and
wherein each disk is mounted to an associated one of the front and rear rockshafts by one of the shanks.

5. The compact tillage implement of claim 4, further including a front actuator operatively coupled to the front rockshaft to pivot the front plurality of disks and a rear actuator operatively coupled to the rear rockshaft to pivot the rear plurality of disks.

6. The compact tillage implement of claim 4, wherein, at least in part, each of the shanks is curved and has a first end with a round cross-section and a second end with a flat cross-section.

7. The compact tillage implement of claim 4, wherein the shank for each disk is mounted to the associated rockshaft at one of a frame side of the associated rockshaft and a ground side of the associated rockshaft.

8. The compact tillage implement of claim 7, wherein each disk of the front rank is mounted to the front rockshaft to be at a first steer angle with respect to the direction of travel and each disk of the rear rank is mounted to the rear rockshaft to be at a second steer angle with respect to the direction of travel; and
wherein the first and second steering angles are equal and opposite with respect to the direction of travel.

9. The compact tillage implement of claim 7, wherein each disk of the front rank is mounted to the front rockshaft to be at a first range of tilt angles with respect to vertical at angular positions of the disks from the retracted to the extended orientations and each disk of the rear rank is mounted to the rear rockshaft to be at a second range of tilt angles with respect to vertical at angular positions of the disks from the retracted to the extended orientations.

10. The compact tillage implement of claim 9, wherein the first and second ranges of tilt angles are equal and opposite with respect to vertical at the angular positions of the tools from the retracted to the extended orientations.

11. The compact tillage implement of claim 9, wherein the first and second ranges of tilt angles increase in angle with respect to vertical as the front and rear pluralities of disks are pivoted away from the frame.

12. The compact tillage implement of claim 9, wherein the front and rear ranks are movable in a height direction with respect to at least one of the frame and the wheels.

13. The compact tillage implement of claim 12, further including an actuator for changing the height of the front and rear ranks relative to at least one of the frame and the wheels.

14. The compact tillage implement of claim 12, wherein the first and second ranges of tilt angles are substantially the same at different heights of the ranks with respect to at least one of the frame and the wheels.

15. The compact tillage implement of claim 14, wherein the front and rear wheels are mounted to the frame by pivotal arms; and wherein pivoting the front and rear wheels changes the height of the front and rear ranks relative to the wheels.

16. The compact tillage implement of claim 14, further including at least one sub-frame mounted to the frame to move in the height direction to change the height of the front and rear ranks relative to the frame and the wheels; wherein the front and rear ranks are pivotally mounted to the at least one sub-frame.

17. A compact disk tillage implement, comprising:
a frame supported by front and rear frame wheels;
a front disk rank mounted to the frame between the front and rear wheels with respect to a direction of travel to move a front plurality of disks with respect to the frame from a retracted orientation to an extended orientation, the front disk rank includes a front rockshaft and a plurality of shanks, wherein each of the disks is attached to the front rockshaft by one of the plurality of shanks, the plurality of shanks configured to enable each of the plurality of tools to move vertically independently of one another; and
a rear disk rank is mounted to the frame between the front and rear wheels with respect to the direction of travel to move a rear plurality of disks with respect to the frame from a retracted orientation to an extended orientation, the rear disk rank being mounted to the frame to be spaced behind the front disk rank along an implement reference line that extends in the direction of travel and intersects the front and rear disk ranks, the rear disk rank includes a rear rockshaft and a plurality of shanks, wherein each of the disks is attached to the rear rockshaft by one of the plurality of shanks, the plurality of shanks configured to enable each of the plurality of tools to move vertically independently of one another;
wherein the front and rear plurality of disks are pivotal with respect to the frame independently of the other of the front and rear plurality of disks while the frame is in a working orientation in which the frame has a substantially fixed pitch with respect to the ground.

18. The compact disk tillage implement of claim 17, wherein the front and rear disk ranks are movable in a height direction with respect to at least one of the frame and the wheels.

19. The compact disk tillage implement of claim 18, wherein the front and rear wheels are mounted to the frame by pivotal arms; and
wherein pivoting the front and rear wheels changes the height of the front and rear disk ranks relative to the wheels.

20. The compact disk tillage implement of claim 18, wherein the front and rear disk ranks are pivotally mounted to at least one sub-frame; and wherein the at least one sub-frame is mounted to the frame to move in the height direction to change the height of the front and rear disk ranks relative to the frame and the wheels.

* * * * *